United States Patent [19]

Rhee et al.

[11] Patent Number: 5,118,445
[45] Date of Patent: Jun. 2, 1992

[54] CONDUCTIVE HIGH POLYMER COMPOSITE OF POLYALKYLETHER AND AROMATIC POLY-HETEROCYCLES AND A PROCESS FOR PREPARING OF IT

[75] Inventors: Suh B. Rhee; Myong H. Lee; Yong K. Kang, all of Taejeon, Rep. of Korea

[73] Assignee: Korea Research Institute of Chemical Technology, Rep. of Korea

[21] Appl. No.: 434,080

[22] Filed: Nov. 9, 1989

[30] Foreign Application Priority Data

Nov. 9, 1988 [KR] Rep. of Korea ............... 88-14681

[51] Int. Cl.$^5$ .............................................. H01B 1/06
[52] U.S. Cl. .................................... 252/500; 252/518; 252/519
[58] Field of Search ............... 252/500, 512, 518, 519; 526/256, 258; 524/157, 158, 435; 525/326.7, 360, 366, 374, 367, 378

[56] References Cited

PUBLICATIONS

New Routes to Conjugated Polymers: 1. A Two Step Route to Polyacetylene, Edwards et al., *Polymer*, Mar. 1984, vol. 25, pp. 395–398.
Polymer Communications, Galvin et al., *Polymer*, Jun. 1982, vol. 23, pp. 795–797.

*Primary Examiner*—Josephine Barr
*Attorney, Agent, or Firm*—Michael L. Dunn

[57] ABSTRACT

A conductive high polymer composite, which is composed of polyalkylether and aromatic poly-heterocycles, the composite having higher mechanical strength, pliability and excellent working properties, and may be used in storage battery, electrochromic display devices, photocell or the other semiconductor articles. The composite may be prepared by a chemical or electrochemical method.

4 Claims, No Drawings

CONDUCTIVE HIGH POLYMER COMPOSITE OF POLYALKYLETHER AND AROMATIC POLY-HETEROCYCLES AND A PROCESS FOR PREPARING OF IT

TECHNICAL FIELD

The present invention relates to a novel conductive high polymer composite of polyalkylether and aromatic polyheterocycles and a process for preparation, in particular, to the conductive high polymer composite which has the higher strength, pliability and excellent working property.

BACKGROUND OF THE INVENTION

It is known that conductive high polymer compounds include polyacetylene, polypyrrole, polythiophene etc., and they may be applied to various industrial fields such as storage batteries, electrochromic display devices, photocells or other semiconductor articles due to various electrochemical properties such as conductivity of the compounds.

Particularly, the aromatic heterocyclic polymers such as polypyrrole or polythiophene are prepared by a chemical polymerization, using an oxidant such as ferric chloride, and also by an electrochemical polymerization. Recently, numerous research publications and patents have been made public in this field. But, although the known conductive high polymer compounds have excellent electric properties, when the compounds are used to make goods, the goods are easily breakable due to the low mechanical strength of the compound.

Therefore, it was necessary that conductive polymers be prepared having higher strength as well as the prior properties in order to use them in various fields.

In order to find solutions to the above problems, examples of disclosed methods for preparing conductive high polymer composites with the improved property are summarized as follows.

Firstly, there is a process for improving the working property of a conductive high polymer by using a precursor polymer soluble in a solvent. This process is very difficult and intricate, and has the fault that the conductivity of the high polymer is reduced. [Polymer, 1984, 25, 395]

Secondly, there is a method that is comprised of dispersing a catalyst in the base resin and compounding the dispersed resin with a conductive high polymer compound. For example, Ziegler-Natta catalyst is dispersed in the low density polyethylene and it is compounded with a polyacetylene by polymerizing at temperatures of 100° to 120° C. to obtain a conductive high polymer composite. It is known that while the obtained composite has the excellence of mechanical strength, decreases in the conductivity are observed even though after dopping. [Polym. Commun., 1982, 23, 795]

Thirdly, a method is to use para-toluene sulfonate as the electrolyte used for electrochemical polymerization. In this case, a conductive high polymer compound having the high mechanical strength may be prepared without any change in the conductivity. But, the polyelectrolyte in the composite dissolves out after repetitive red-ox reactions in the solution, resulting in the reweakening of the mechanical strength. Therefore, this method is not applicable where the solution is used such as in the case of a storage battery. [IBM J. Res. Dev., 1983, 27, 342]

Fourthly, it is known that a method is provided to form a composite of polyvinyl chloride and polypyrrole or polythiophene, by using an electrode having a surface coated with polyvinyl chloride layer in the step of the electrochemical polymerization, wherein the monomer such as pyrrole or thiophene swells polyvinyl chloride and then the polymerization reaction is carried out therein. This method may be characterized in which the formed conductive high polymer composite has simultaneously the high mechanical strength and the high electric conductivity [Macromol., 1986, 20, 749]. But, in this method, the addition of a stabilizer etc. is necessary since polyvinyl chloride (which has low oxidation stability), is used, consequently, the obtained high polymer composite is not applicable to semiconductor articles o to materials for storage batteries. In view of the above, if the stabilizer is not used, the properties of the composite ar deteriorated owing to the degradation of polyvinyl chloride.

Therefore, there still exists a need for a conductive high polymer composite having the higher mechanical strength, pliability and excellent working properties with the know probable properties.

SUMMARY OF THE INVENTION

It is an object of the present invention to provide a conductive high polymer composite having the higher mechanical strength with the good pliability and a process for preparing it, according to a chemical or electrochemical method using a polyalkylether or its derivatives as an unconductive resin and an aromatic heterocyclic polymer such as polypyrrole, polythiophene or its derivatives as a conductive resin.

DETAILED DESCRIPTION OF THE INVENTION

The present invention is directed to a conductive high polymer composite of polyalkylether and aromatic polyheterocycles which comprises repeating units represented by the following structure formula(I) and repeating units represented by the following structure formula(II) composed in the ratio of 1:10 to 10:1:

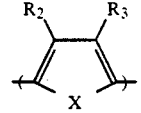

wherein,
$R_1$ is selected from the group consisting of $-(CH_2)_x-$, x being an integer of 2 to 8, and

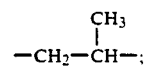

$R_2$ and $R_3$ may be independently $-CH_3$, $-CH_2CH_3$, $-CH_2CH_2CH_3$, $-C(CH_3)_3$, $-CH(CH_3)_2$, $-C_6H_5$; and X represents $>N$ or $>S$.

Said new composite according to this invention may be prepared by chemical or electrochemical methods as follows:

In the case of chemical methods, firstly, a solution is prepared by dissolving, in a solvent, a polyalkylether or its derivatives having repeating units of the above formula(I) and an oxidant such as ferric trichloride. An aromatic heterocycle monomer is added and polymerized in said solution. As a result, a conductive high polymer composite is obtained having a structure with repeating units of the above formula(II) within a resin which has repeating units of the above formula(I). (Hereinafter referred to "Method I")

Secondly, an aromatic poly-heterocycle having repeating units of the above formula(II) is prepared from an aromatic heterocyclic monomer such as pyrrole and an oxidant such as ferric trichloride. The prepared compound is mixed within a resin solution having repeating units of the above formula(I), and dried it to obtain a conductive high polymer composite. (Hereinafter referred to "Method II")

Meanwhile, as an electrochemical method, the electrode, coated with resin having repeating units of the above formula(I) which is dissolved in a solvent, is used in this method. An aromatic heterocyclic monomer such as pyrrole is electrochemically polymerized by electrolytic polymerization in an electrolyte as using said electrode, and then a conductive high polymer composite may be obtained as film. (Hereinafter referred to "Method III")

The above three methods for preparing the conductive high polymer composite according to this invention are detailed as follows:

Method I

A resin having repeating units of the above formula (I) of 0.1 to 1 mole is dissolved in a solvent with an oxidant of 0.1 to 1 mole. Said resin solution is polymerized with an aromatic heterocyclic monomer to obtain a conductive composite.

In this method, the polymerization reaction may be comprised of mixing said aromatic heterocyclic monomer within said resin solution and stirring it at the temperature of 0° C. to 60° C. during 3 to 48 hours and drying under the vacuum, or comprised of drying said resin solution and polymerizing it with said aromatic heterocyclic monomer in the vessel.

Ferric chloride may be desirably used as said oxidant, and pyrrole used as said aromatic heterocycle monomer. An organic solvent may be used as said solvent for preparing said resin solvent, such as particularly acetone, chloroform, dichloromethane, tetrahydrofuran or benzene.

Method II

An aromatic heterocyclic polymer is prepared from an aromatic heterocyclic monomer and an oxidant such as ferric chloride according to known methods. Said compound is ground into fine powder by using mortar and violently mixed with a resin solution which has repeating units of the above formula(I), in the ratio of 1:20 to 30:1. The solvent in the mixture is dried to obtain a conductive high polymer composite.

The best result may be accomplished when said resin solution has the concentration of 5 to 30%.

Method III

The electrode, coated and dried with a resin solution having repeating units of the above formula (I) is used in this method. An aromatic heterocyclic monomer of 0.01 to 0.5 mole is polymerized with said coated resin by electrolytic polymerization method in the solution including an electrolyte by using said electrode, wherein voltage of $-0.5$ to $1.0$ V or electric current of $0.1$ to $5$ $mA/Cm^2$ against Calomel Reference Electrode is circulated into said electrode during 0.1 to 4 hours, to obtain a conductive high polymer composite.

The best result may be accomplished when said resin solution has the concentration of 1 to 30%.

In this method, an alkylammonium salt or alkali metal salt may be desirably used as said electrolyte for the polymerization, and also an alkali salt of para-toluene sulfonate with good effect.

A general inactive organic solvent such as acetonitrile or propylene carbonate may be used as the solvent for electrolytic polymerization.

As the above, the conductive high polymer composite according to this invention is a new compound comprising repeating units of the above formula(I) and (II), has the high conductivity of 0.1 to 20 S/Cm due to having units of the above formula(II), and simultaneously has the high mechanical strength due to the resin having units of the above formula(I).

Therefore, the composite of this invention is useful for storage batteries, electrochromic display devices or other semiconductor articles, as a desirable material, in any field using a conductive high polymer material where the mechanical strength and electric properties are required.

The following examples and preparations describe the manner and process of making and using the invention and set forth the best mode contemplated by the inventors of carrying out the invention, but are not to be construed as limiting.

Example 1

Polyethylene oxide (10 g) and ferric chloride (24.3 g) was poured in a flask and dissolved in 500 ml of dichloromethane and mixed with 10 g of pyrrole.

The mixture was stirred at room temperature during 24 hours to produce the concentrated solution of black color, and then dried to obtain the high polymer composite with the conductivity.

It was confirmed that the obtained substance has a conductivity of $2 \times 10^{-2}$ S/Cm as obtained by the Four Probe Method.

Example 2

Polybutylether (10 g) and ferric chloride (24.3 g) was poured in a flask and dissolved in 500 ml of tetrahydrofuran, wherein pyrrole was mixed.

The mixture was stirred at room temperature during 24 hours to produce the concentrated solution of black color, and then dried to obtain the high polymer composite with the conductivity.

It was confirmed that the obtained substance has the conductivity of 0.1 to 2.6 S/Cm as obtained by the Four Probe Method.

Example 3

Polybutylether (10 g) and ferric chloride (24.3 g) was poured in flask and dissolved in 500 ml of tetrahydrofuran, the solution coated on the containing plate and dried it. The coated glass plate was placed in a vessel containing pyrrole under vacuum during 48 hours. The vapor of pyrrole was polymerized in polybutylether coated on the glass plate. So, the conductive composite film with black color was obtained.

It was confirmed that the obtained composite has the conductivity of 0.5 S/Cm as the result of measurement by the Four Probe Method.

Example 4

Pyrroles were polymerized by using ferric chloride in prior art, and the obtained polypyrrole (10 g) was ground in a mortar to produce fine powder. It was mixed with polybutylether (10 g) dissolved in 500 ml of tetrahydrofuran, and stirred well.

The solution in the mixture was dried to obtain the composite with black color. It was confirmed that the obtained composite has the conductivity of $5.3 \times 10^{-4}$ S/Cm as the result of measurement according to the Four Probe Method.

Example 5

Dichloromethane solution including 5% polyethylene oxide on the platinium plate of $1 \times 1$ Cm size to thickness of 40 μm and it was used to working electrode. Electric potential of $-0.6$ to $0.9$ V was circulated into said working electrode in the rate of 50 mv/sec during one hour against Calomel Reference Electrode at the room temperature, in acetonitrile electrolyte including tetrabutyl ammonium perchlorate of 0.1M and pyrrole (0.06M), and then polypyrrole-polybutylether composite with black color was prepared on said working electrode.

The conductivity of the prepared composite was 6 to 8 S/Cm in accordance with polymerization time as the result of measurement by the Four Probe Method.

Example 6

Tetrahydrofuran solution including 5% polybutylether coated on platinium plate of $1 \times 1$ Cm size to thickness 40 μm. and it was used to working electrode.

Electrode potential of $-0.3$ to $0.8$ V was circulated into said working electrode at the room temperature, in acetonitrile electrolyte including tetrabutyl ammonium perchlorate (0.1M) and pyrrole (0.06M), and polypyrrole-polybutylether composite with black color was prepared on said working electrode.

The conductivity of the prepared composite was 1 to 10 S/Cm in accordance with polymerizing time as the result of measurement using the Four Probe Method.

Example 7

The composite with black color was prepared by electrolytic polymerization under the same conditions as example 6, but the polymerization temperature was more than melting point of polybutylether at 50° C.

The conductivity of the prepared composite was 5 to 10 S/Cm as the result of measurement using the Four Probe Method.

Example 8

The conductive composite was prepared by applying the constant electric current of 1 mA/Cm² during 2 hours in return for the cyclovoltammetric method, but under the same conditions as example 6.

The conductivity of the prepared composite was $2.1 \times 10$ S/Cm as the result of measurement using the Four Probe Method.

Example 9

The conductive composite with black color was prepared on the working electrode by polymerizing at 50° C., but under the same conditions as example 8.

The conductivity of the prepared composite was $1.2 \times 10$ S/Cm as the result of measurement by the Four Probe Method.

As the result of said examples, the conductive high polymer composites according to this invention have the high pliability, high mechanical strength and conductivity. Therefore, the usable industrial field of the conductive high polymer may be largely contended by this invention.

And, when this invention is compared with the prior art in the prepared composite, the composite according to this invention has the high strength and simultaneously good conductivity due to using polyalkylether having repeating unit of the above formula(I), but the prior composite has the lower pliability and oxidation stability because of using polyvinyl chloride.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

What is claimed is:

1. A conductive high polymer composite comprising a dopant and a polyalkylether and aromatic polyheterocycles said polyalkylether comprising repeating units represented by formula(I) and said aromatic polyheterocycle comprising repeating units represented by formula(II);

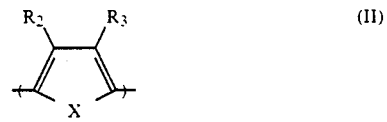

wherein, $R_1$ is selected from the group consisting of $-\!\!+\!\!CH_2\!\!\xrightarrow{}_x$, x being an integer of 2 to 8, and

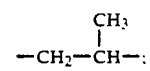

$R_2$ and $R_3$ are independently selected from the group consisting of $-CH_3$, $-CH_2CH_3$, $-CH_2CH_2CH_3$, $-C(CH_3)_3$, $-CH(CH_3)_2$ and $-C_6H_5$; and X is $>N$ or $>S$; said polyalkyl ether and said aromatic polyheterocycles being present in a ratio of 1:10 to 10:1.

2. The composite of claim 1 wherein the dopant is an electrolyte selected from the group consisting of alkylammonium salts, alkali metal salts and alkali metal salts of organic acids.

3. The composite of claim 1 wherein the electrolyte is sodium paratoluene sulfonate.

4. The composite of claim 1 wherein the dopant is a residual ferric chloride catalyst.

* * * * *